May 20, 1930. C. MÜLLER ET AL 1,759,661
FINELY DIVIDED METALS FROM METAL CARBONYLS
Filed July 2, 1927
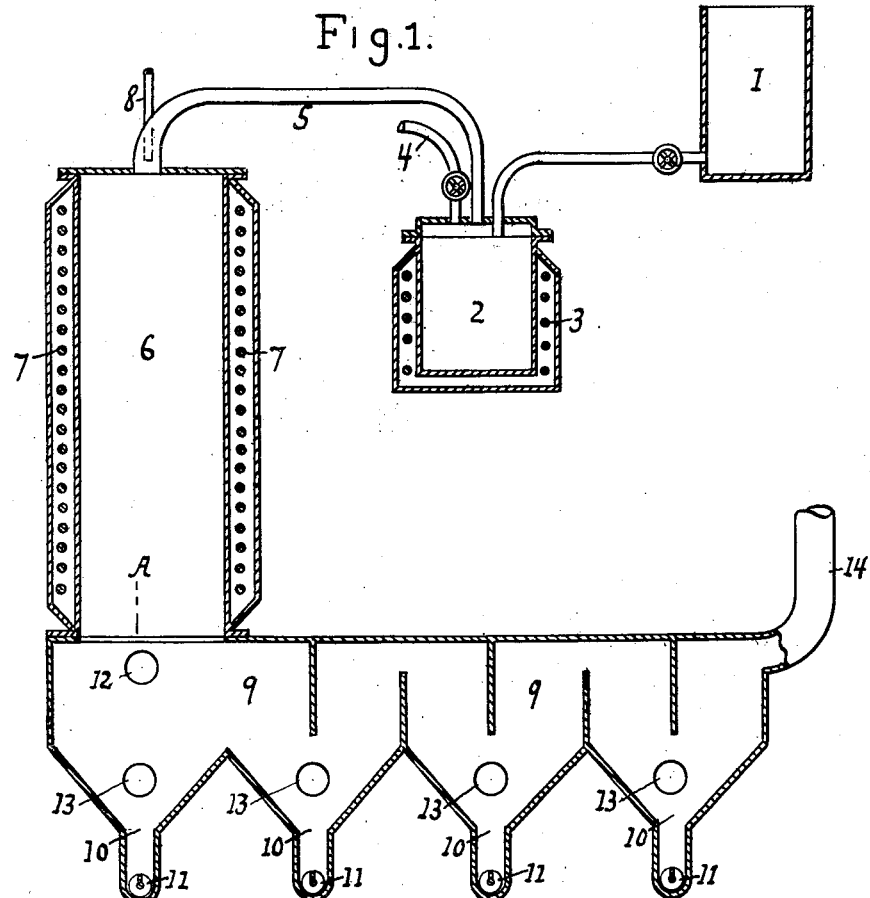
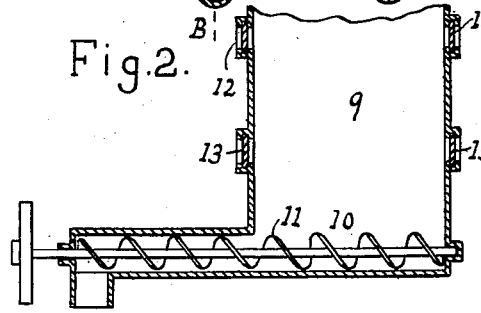
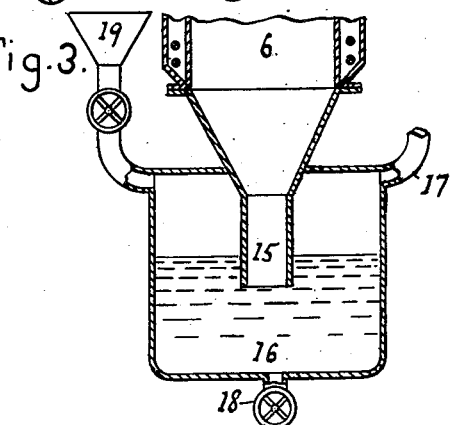
INVENTORS
Carl Müller
Walter Schubardt
By Hauff & Varland
ATTORNEYS Patented May 20, 1930

1,759,661

UNITED STATES PATENT OFFICE

CARL MÜLLER, OF MANNHEIM, AND WALTER SCHUBARDT, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

FINELY-DIVIDED METALS FROM METAL CARBONYLS

Application filed July 2, 1927, Serial No. 203,242, and in Germany July 6, 1926.

This invention relates to the production of pure metals in a finely divided state by the thermal decomposition of metal carbonyls, other than iron carbonyl, or mixtures of the same either with each other or with iron carbonyl.

We have found that the thermal decomposition of the carbonyls of nickel, cobalt or molybdenum mixtures of the same with each other or with iron carbonyl can advantageously be effected by introducing the carbonyl into a heated vessel in such a manner that the decomposition takes place substantially in the free space of the vessel instead of by contact with the heated walls of the vessel. According to this process carbonyl is introduced in a liquid or vapor state at a considerable distance from the hot walls of the vessel, the size and shape of which are preferably so chosen that the surface of the walls is as small as possible in proportion to the containing part of the vessel, as is the case for example in a pipe of large internal diameter or in a ball-shaped vessel.

For example, the carbonyl is introduced by means of a nozzle into the upper end of a wide vertical pipe or vessel heated externally, the nozzle being of such shape as to cause the vapor or liquor particles to move not against the walls but in the direction of the axis of the pipe or vessel. The carbonyl is decomposed to carbon monoxid and finely dispersed metal which is conducted downwards by the gas current and which can be separated at the lower end of or outside the pipe or vessel by mechanical, electric, magnetic or other means.

The temperature within the decomposing vessel is preferably chosen between 100° C. and 400° C. On the one hand, the temperature must be high enough to effect a rapid and complete decomposition of the carbonyl passed through the vessel; otherwise the carbonyl would not only contaminate the metal, but might also cause subsequent ignition when air is allowed to have access. On the other hand, the temperature must not substantially exceed 400° C., as at higher temperatures the metal is oxidized by carbon monoxid and contaminated by carbon and carbides and, moreover, carbon monoxid itself is largely decomposed to carbon and carbon dioxid according to the equation: $2CO = C + CO_2$. As these two reactions are to a large extent exothermic, while by the decomposition of the metal carbonyl heat is consumed, an occurrence of the undesirable reaction leading to a contamination of the metal by metal oxid and carbon, is soon indicated by the temperature in the vessel rising.

At very high temperatures, however, the afore-said side reactions take place again to a smaller extent, that is to say, carbon monoxid becomes increasingly more stable in the presence of the metals and therefore the decomposition of the metal carbonyl can also be effected at very high temperatures of above about 900° C. In this case, it is necessary to prevent the metal from coming into contact with carbon monoxid for a longer time in the interval of temperature down to about 400° C. while cooling it, as it would otherwise subsequently be considerably contaminated by carbon.

The most suitable temperature for working depends on the concentration and nature of the carbonyl, on the speed of the gas current, on the size and form of the vessel and on the pressure under which the process is carried out which may be ordinary, reduced, or increased pressure. For example, cobalt carbonyl vapor, diluted with carbon monoxid, when passed into a chamber heated to 150° C. furnishes practically pure cobalt, in a state of extremely fine division. As a rule, low temperatures give a dense, very fine metallic powder, whilst at higher temperatures light, spongy metallic flakes, are produced which are particularly suitable for catalytic purposes. These carbonyls will be hereinafter referred to as carbonyls of metals having an atomic weight higher than 56.

The metal carbonyl, or carbonyl mixture, is preferably introduced into the decomposition chamber in the form of vapor, or mist, and either in an undiluted state or mixed with inert gases or vapors, which are preferably preheated to the temperature at which the decomposition is to be carried out. If, as is the case with cobalt carbonyl, the carbonyl is a solid and has only a low vapor tension, it may be fused under compressed carbon monoxid and atomized in the heated chamber, or the carbonyl (or mixture) may be dissolved in a suitable solvent, such as benzine, and the solution injected into the decomposition chamber. In this case the metallic powder resulting from the decomposition of the carbonyl in the free space, falls to the bottom, whilst the solvent escapes, in the form of vapor, with the carbon monoxid, and can be recovered therefrom by cooling or other suitable means. Liquid carbonyls may also be used to dissolve the solid carbonyls for instance cobalt corbonyl may be dissolved in nickel carbonyl.

For certain purposes the finely divided metal produced is advantageously separated from the gases leaving the furnace by passing them through an inert liquor or melt, for example melted paraffin wax, with which the metal forms a suspension. Or the bulk of the metal may be separated in any desired manner and only part of it by the modification just described.

An apparatus suitable for carrying out our invention is diagrammatically illustrated by way of example in the accompanying drawing, but our invention is not limited to this example.

The apparatus shown in Figure 1 consists of a container 1 for liquid metal carbonyl and an evaporator 2 provided with a heating jacket 3. The metal carbonyl is vaporized in the evaporator and its vapors may be mixed with other gases or vapors by means of a pipe 4; the gas is then passed through a pipe 5 into the decomposition vessel 6, provided with a heating jacket 7. If desired, catalysts may be introduced into the decomposition vessel by means of a nozzle 8 of any known kind for which purpose finely divided solids such as nickel or cobalt powder are advantageously employed as the fine particles thereof initiate the decomposition, or a gas like ammonia may be added which also accelerates the decomposition. The metal powder formed by the action of the radiant heat of the walls in the free space of the decomposition vessel, is separated in dust chambers 9 and deposited in collecting chambers 10 (a side view whereof is shown in section in Figure 2 taken on the line A—B Figure 1), from which it is removed for example by the worm conveyor 11. The proceeding of the reaction in the decomposition vessel and the level of the metal powder deposited in the chamber 10 can be observed by the observation windows 12 and 13 respectively. The carbon monoxid formed by the decomposition is withdrawn by a pipe 14 and may be employed for any desired purpose, for example for a fresh formation of metal carbonyl.

Figure 3 shows an apparatus suitable for separating the finely divided metal by means of a liquid or melt. In this case the lower part of the decomposition vessel 6 is provided with a pipe 15 immersed into the liquid or melt contained in vessel 16. The gas mixture containing the metal powder is passed through the liquid or melt by pressure or suction, as desired. The carbon monoxid leaves the apparatus through the pipe 17. The liquid or melt containing the metal powder in suspension may be withdrawn by a pipe 18 and fresh liquid or melt may be introduced into the vessel by the pipe 19.

What we claim is:

1. The process of producing pure metals which comprises decomposing metal carbonyls of metals having an atomic weight higher than 56, in the hot free space of a heated vessel at a substantial distance from the hot walls of the vessel.

2. The process of producing pure metals which comprises decomposing metal carbonyls of metals having an atomic weight higher than 56 in the free space of a vessel heated to a temperature higher than about 100° C., but not ranging between about 400° and 900° C., substantially without bringing the carbonyls into contact with the hot walls of the vessel.

3. As now articles of manufacture, cobalt and molybdenum obtained by the decomposition of metal carbonyls of metals having an atomic weight higher than 56 in the hot free space of a heated vessel at a substantial distance from the hot walls of the vessel, in a finely divided state and containing at the most traces of carbon.

In testimony whereof we have hereunto set our hands.

CARL MÜLLER.
WALTER SCHUBARDT.